Patented Sept. 22, 1942

2,296,636

UNITED STATES PATENT OFFICE 2,296,636

HIGH SURFACE HIDING PIGMENT MATERIAL AND PROCESS OF MAKING THE SAME

Marion L. Hanahan, Wilmington, Del., assignor to E. I. du Pont de Nemours & Company, Wilmington, Del., a corporation of Delaware No Drawing. Application December 8, 1938, Serial No. 244,571

29 Claims. (Cl. 106—294)

This invention relates to the art of white pigment materials. More particularly it relates to the improvement of the properties of white pigment materials. Still more particularly it relates to the improvement of the hiding power of white pigment materials in flat paint formulations, paper coating compositions, etc.

Flat paint formulations, which are used so widely, comprise prime white pigment materials such as titanium oxide, titanates of divalent metals, lithopone, zinc sulfide, zinc oxide, white lead, and the like, having a refractive index of not less than about 1.9. It is commonly believed in the art that the hiding and brightening power of a white pigment material when used in coating compositions which compositions are to be applied to wood, metal, paper, linoleum, oil cloth, and the like, or when used as a filler in paper, rubber, and the like, is dependent entirely upon the index of refraction, color, and ultimate particle size of said pigment. I have discovered, however, that such is not the case. While such properties as index of refraction, color, and ultimate particle size do exert an effect, I have found that when the pigment is used in certain coating compositions, such as flat paint formulations and casein and starch paper coating compositions, and when used as a filler such as a paper filler, its hiding power is dependent to a certain extent on pigment oil absorption and to a remarkable and hitherto unrealized extent on a property which I call "surface hiding power" and which I shall discuss in more detail below. Pigments with high surface hiding power have hitherto been unknown. Now, however, I have discovered a process whereby the property of high surface hiding power may be imparted to white pigment materials, thereby producing unique pigments of tremendous industrial importance. Such pigments have particularly high hiding power in flat paint formulations, and as a result, can be considered to have high flat hiding power in such formulations. Furthermore, they have high opacifying power in paper, and in starch and casein coating compositions applied to the surface of paper. As a matter of fact, I have discovered that pigments having the property of high surface hiding power produce high hiding, opacifying and/or brightening in all pigment-adhesive systems in which the mean index of refraction of the adhesive system is substantially lower than 1.5. A sheet of paper, for example, can be considered to be an adhesive comprising essentially paper fiber having an index of refraction of approximately 1.53 and air of index of refraction of 1. The mean index of refraction of said adhesive is substantially lower than 1.5 and white pigments therein having high surface hiding power are definitely better opacifying and brightening agents than are comparable prior art pigments of essentially equal index of refraction, color, and ultimate particle size. Again, flat paint films, in which I have found high surface hiding pigments to be so effective, comprise numerous void spaces and/or pigment-air interfaces. As a consequence, the effective mean index of refraction of the adhesive portion is substantially lower than that of the binder portion, e. g., is substantially lower than 1.5. However, I have discovered that in pigment-adhesive systems in which the effective mean index of refraction of the adhesive approximates or exceeds 1.5, such as enamel paint films in which the pigment is essentially immersed in the binder, the property of high surface hiding power does not influence the hiding power of a pigment.

For a better understanding of the characteristics desired in pigment materials used in flat paint formulations, it will be necessary to explain the various terms used herein and the method of testing employed:

*Flat paint formulation*

A flat paint formulation produces a dry paint film in which the binder portion is insufficient to fill all void spaces between pigment particles and which in consequence has a micro rough surface of relatively low specular reflection. Such a paint has a pigmentation in excess of about 40% by volume on the dry film and usually in excess of about 50% by volume.

On the other hand, an enamel paint formulation produces a dry paint film in which the binder portion is sufficient to fill essentially all void spaces between pigment particles and which in consequence has a micro smooth surface of relatively high specular reflection. Such a paint has a pigmentation of less than about 35% by volume on the dry film and usually less than about 30% by volume.

*Hiding power*

Hiding power may be defined qualitatively as that property of a paint which enables it to obliterate beyond recognition any background over which it may be spread. Mathematically, it may be expressed as square feet per gallon of paint.

It is determined by the procedure entitled "Krebs dry film incomplete hiding power" described by Henry A. Gardner in "Physical and Chemical Examination of Paints, Varnishes, Lacquers and Colors," 8th edition, January 1, 1937, pp. 45–51.

In this test the paints being studied are painted out on a surface on which a design of concentric light and dark diamonds is printed. The light and dark bands are ½" wide. Their lightness factors are 75% and 40% respectively. The area of the surface is one square foot. It is printed on heavy paper and then coated with a nitrocellulose lacquer. In applying the paint a 20 cubic centimeter Luer type glass syringe filled with the paint, and the brush, also filled with the paint, are weighed together. The paint is spread uniformly over the chart with the syringe and then spread with the brush. The syringe and brush are again weighed. Several brushouts, for example, six or eight, are made with a paint selected as the standard, beginning with five to seven cubic centimeters of paint and increasing the amount in increments of 0.5 to 1.0 cubic centimeter. The application of the paint by volume is merely a guide. The actual weight of the paint applied, as determined by the difference in weight of the syringe and brush before and after application, is used in the calculation. Two or three brushouts of the paints to be compared are then prepared with different quantities of paint such as 6, 7 and 8 cubic centimeters.

When dry, the brushouts are numbered consecutively in the order of increasing quantity of paint for identification. The sample brushouts are then located with respect to their degree of hiding by placing each of them between reference standards showing less or more hiding. If possible, the ratings should be estimated in tenths. Thus 2.4 means that the sample is located 0.4 of an interval between standards No. 2 and No. 3.

The hiding power of a paint is calculated as follows:

$$\text{Hiding power} = \frac{\text{volume of standard paint}}{\text{volume of sample paint}} \times 100$$

when the volume of standard paint is that required to give the same contrast as that given by the volume of sample paint.

The following is a specific example of a hiding power determination made by this method:

Weight of standard paint per gal____lbs__ 15.69
Weight of sample paint per gal_____lbs__ 13.54
Brushout of sample_____g__ 5.40
Brushout of standard 1_____g__ 6.50
Brushout of standard 2_____g__ 7.40
Sample rating_____ 1.4

Hence, weight of standard paint of equivalent hiding is:

$$6.50 + 0.4(7.4 - 6.5) = 6.86 \text{ g.}$$

The volume of which is:

$$\frac{6.86 \times 8.33}{15.69} = 3.64 \text{ cubic centimeters}$$

The volume of the sample is:

$$\frac{5.40 \times 8.33}{13.54} = 3.32 \text{ cubic centimeters}$$

The relative hiding power of the sample is:

$$\frac{3.64}{3.32} \times 100 = 110$$

*Pigment flat hiding power*

Strictly speaking, the expression "hiding power" should only be applied to paint formulae, i. e. to mixtures of pigment and vehicle. Nevertheless, pigments may be said to possess potential hiding power and the potential hiding power of a pigment in a flat paint formulation may be considered to be its flat hiding power. This flat hiding power is defined as follows:

$$F.H.P. = \frac{\text{Wt. standard pigment per unit vol. standard paint}}{\text{Wt. sample pigment per unit vol. sample paint}} \times H.P.$$

in which F. H. P. is the flat hiding power of the sample pigment and H. P. is the hiding power of the sample flat paint as determined by the hereinbefore described "Krebs dry film incomplete hiding power" procedure.

*Oil absorption*

Oil absorption is the amount of oil in grams required to wet 100 grams of pigment.

The method of testing is described on pages 540–541 of Gardner's above cited book.

A five gram sample is used. Acid refined linseed oil of acid number 12.5 is added slowly from a burette and worked into the pigment with a spatula on a smooth glass plate. The addition of oil is continued a drop or two at a time until the pigment can be collected in one coherent mass adhering to the spatula but not wetting the glass. The amount of oil used to wet the pigment is read from the burette.

Attempts have been made in the past to treat white pigment materials with silica and compounds of silica. For example, U. S. Patent 1,486,077 discloses the addition of sodium silicate to lithopone prior to calcination of said lithopone. Such treatment is said to increase the oil absorption of the lithopone. However, it increases the zinc oxide content of the lithopone to an undesirable extent and furthermore does not produce a lithopone with high surface hiding power.

In addition, U. S. Patents 1,826,131, 1,826,132, 1,937,037 and 2,044,941 disclose the addition of small amounts of sodium silicate as dispersing agents, to dilute slurries of calcined lithopone and titanium dioxide. Thus, U. S. Patent 1,937,037 discloses the use of 2.38% sodium silicate commodity basis which is equivalent to an addition of sodium silicate in an amount corresponding to 0.59% $SiO_2$ on the basis of the weight of the $TiO_2$ present. I have determined in my laboratory that the processes of the hereinabove U. S. patents do not produce pigments of high surface hiding power.

Moreover, U. S. Patent 1,949,925 discloses the addition of about 0.3–0.5% of sodium silicate on the basis of the lithopone, to an alkaline slurry of wet milled calcined lithopone and thereafter filtering and drying the product. The silicate treatment therein disclosed produces a lithopone which is highly alkaline, is wet readily by paint vehicles, and which forms paints of excellent flowing characteristics. However, said treatment does not produce a lithopone with high surface hiding power.

Furthermore, various forms of silica have been used to extend paint pigments. This silica has ordinarily been the material which is found in nature and which, unless it is found in finely divided state, must be ground to a fine state of subdivision. The silicious calcined gel products, obtained by acidifying an alkaline silicate such as sodium silicate, have also been used after fine grinding. Substantial improvements in the art of silica extenders are disclosed in French Patent 815,184. The process of this patent comprises reacting a silico fluoride in an aqueous solution with ammonia to produce a hydrated silica which possesses the characteristics of a crystalline precipitate. The hydrated silica is blended with pigment either by mixing the silica and pigment or by precipitating the silica in the presence of the pigment or by precipitating the pigment in the presence of the silica, and the blend is then calcined. Extended tests in my laboratory have proved that blended pigments prepared according to French Patent 815,184, or prepared by blending pigment with various forms of silica according to other prior art methods, do not have high surface hiding power.

This invention has as an object the production of white pigments the surface hiding power of which have been increased to an extent heretofore unrealized. A further object is to increase the surface hiding power of white pigment materials comprising prime white pigments having an index of refraction of not less than about 1.9. A still further object is to increase the flat hiding power of white pigment materials employed in flat paints. A still further object is to increase the opacifying power of white pigment materials employed as paper fillers and in paper coating. A still further object is to increase the oil absorption of white pigments. A still further object is to increase white pigment dry bulking value, i. e. the volume per unit weight of dry pigment. Additional objects will become apparent from an examination of the following description and claims.

These objects are attained according to the herein described invention which broadly comprises mixing a water soluble silicate with an aqueous suspension of a white pigment, forming a gel-like coating of the major part of the silica on the pigment, dewatering the pigment suspension and drying the pigment without calcination. The pigment thereby produced possesses greatly increased oil absorption, dry bulking value, and surface hiding power.

In a more restricted sense, this invention comprises mixing with an aqueous suspension of a prime white pigment between about 0.7% and about 35%, calculated as $SiO_2$ and based on the weight of the pigment before treatment, of a water soluble silicate. After the slurry has been agitated sufficiently to insure uniform distribution of the dissolved silicate, it is acidified, thereby precipitating a major part, i. e., 50% or more, of the dissolved silicate on the pigment material particles as a coating of gel-like silica. The slurry is subsequently dewatered and the pigment dried without calcination.

The preferred embodiment of this invention comprises mixing with an aqueous suspension of a prime white pigment, preferably an aqueous suspension of a wet milled calcined lithopone pigment, comprising in excess of about 250 grams pigment per liter, between about 1.5% and about 8%, calculated as $SiO_2$ and based upon the weight of the pigment before treatment, of a water soluble sodium silicate. After the slurry has been agitated sufficiently to insure uniform distribution of the added agent, it is acidified by the addition of sulfuric acid. Subsequently, the slurry is dewatered, as by filtering, and the pigment dried at a temperature between about 110° C. and about 175° C.

The following examples are given for illustrative purposes and are not intended to place any restrictions or limitations on the herein described invention.

*Example I*

Sodium silicate solution, containing 23.5% $SiO_2$ and having a $SiO_2:Na_2O$ ratio of 3.8:1, was added to several portions of a water suspension of calcined wet milled lithopone, comprising 400 grams lithopone per liter, in the amount of 0%, 0.94%, 1.88%, 2.82%, 3.76%, 5.64%, 7.52%, 13.2% and 23.5% $SiO_2$ on the basis of the weight of the lithopone in the several water suspensions. After being agitated sufficiently to insure even distribution of the sodium silicate, the slurries were acidified with sulfuric acid to a pH of 5.5, agitated for an additional 2 hours, allowed to stand for 16 hours, filtered, dried at 140° C., and the resultant pigments dry milled by passage through a squirrel cage disintegrator, thereby providing pigment samples A, B, C, D, E, F, G, H, and I. Evaluation of the pigments so obtained by my novel process showed that they had the following properties:

| Pigment sample | Percent sodium silicate added (calculated as $SiO_2$) | Flat hiding power in representative flat paint formulation | Volume of 85.5 g. dry pigment | Oil absorption |
|---|---|---|---|---|
| | | | c. c. | |
| A | 0 | 100 | 100 | 12.6 |
| B | 0.94 | 120 | 113 | 17.2 |
| C | 1.88 | 125 | 116 | 19.3 |
| D | 2.82 | 125 | 118 | 19.9 |
| E | 3.76 | 129 | 125 | 21.5 |
| F | 5.64 | 151 | 158 | 26.6 |
| G | 7.52 | 166 | 162 | 30.0 |
| H | 13.2 | 173 | 165 | 34.2 |
| I | 23.5 | 176 | 165 | 36.6 |

*Example II*

Sodium silicate solution, containing 23.5% $SiO_2$ and having a $SiO_2:Na_2O$ ratio of 3.8:1, was added to a slurry of calcined wet milled lithopone, comprising 400 grams lithopone per liter, in the amount of 1.9% $SiO_2$ on the basis of the lithopone dry weight. The slurry was neutralized, precipitating $SiO_2$ from the silicate, by the addition of 0.83% orthophosphoric acid, filtered, and dried at 125° C. The oil absorption of the treated pigment was 20.4 versus 11.9 for the untreated pigment. The flat hiding power of the treated pigment in a representative flat paint formulation was 20% greater than that of the untreated pigment.

*Example III*

Sodium silicate solution, containing 23.5% $SiO_2$ and having a $SiO_2:Na_2O$ ration of 3.8:1, was added to a slurry of calcined wet milled lithopone, comprising 400 grams lithopone per liter, in the amount of 1.9% $SiO_2$ on the basis of the lithopone dry weight. After being agitated sufficiently to insure even distribution of the sodium silicate, the slurry was acidified with 0.4% orthophosphoric acid and sufficient sulfuric acid to reduce the pH to 3.6. 0.5% sodium stearate was then added and the slurry was allowed to stand for 24 hours. The treatment was finished by adding sufficient barium hydroxide, $Ba(OH)_2.8H_2O$, to raise the pH to 9.0 and the treated slurry was then filtered and dried at 125° C. The treated slurry showed processing properties superior to those of the untreated slurry and the flat hiding power of the treated pigment was 29.7% greater in a representative flat paint formulation than was that of the untreated pigment.

Example IV 1600 pounds of a sodium silicate solution, containing 23.5% $SiO_2$ and having a $SiO_2:Na_2O$ ratio of 3.8:1, was added to a thick slurry of calcined wet milled lithopone at 7 pH containing 20,000 pounds of lithopone. After an hour's agitation 154 pounds of 65% orthophosphoric acid and 140 pounds of 98% sulfuric acid were added, reducing the pH to 4.3. The pigment slurry was allowed to stand overnight after which barium hydroxide was added in an amount sufficient to raise the pH to 5.6. The slurry was allowed to stand for an additional 24 hours after which 5 pounds of ultramarine blue was added and then 160 pounds sodium stearate. The pH was adjusted to 6.8 by addition of barium hydroxide. The resultant treated pigment slurry was allowed to stand for 2 days. After which it was filtered, dried at 140° C., and dry milled. The oil absorption of the treated pigment was 20.0 compared to 14.0 for the untreated pigment, and the flat hiding power of the treated pigment excelled that of the untreated pigment by more than 40%.

Example V 1527 pounds of sodium silicate solution, containing 23.5% $SiO_2$ and having a $SiO_2:Na_2O$ ratio of 3.8:1, was added to a thick slurry of calcined wet milled lithopone having a 7 pH and containing 19,080 pounds lithopone. The slurry was agitated for 1¾ hours after which 1,890 pounds of 10% sulfuric acid solution was added, reducing the pH to 6.0. The slurry was agitated for an additional hour after which an anhydrous calcium sulfate composition consisting of 153 pounds of anhydrite and 274 pounds of water was added. The slurry was agitated for an additional 16 hours after which 123 pounds of barium hydroxide was added to raise the pH to 10. The treated slurry was allowed to stand for 12 hours and was then filtered, dried at 140° C., and disintegrated. The treated pigment had an oil absorption of 20.8 whereas the untreated pigment had an oil absorption of 14.0. The hiding power of the treated pigment excelled that of the untreated pigment by 46% in a flat paint formulation consisting of 54.69% lithopone, 5.73% whiting, 4.97% asbestine, 0.25% zinc stearate, 0.20% basic carbonate white lead, 4.77% heavy bodied Perilla oil, 15.37% 50 gal. limed rosin varnish, 13.69% mineral spirits and 0.24% driers, said flat paint formulations having a pigment/binder ratio of 55.68/44.32 by volume.

Example VI

16%, on the basis of the weight of the fiber, of the novel lithopone product of Example IV was stirred into a water suspension of rosin sized beaten bleached sulfite paper fiber and sheets of paper were prepared therefrom on a laboratory paper sheet mould. The paper so formed, comprising 10.27% of my novel lithopone, had a basis weight of 30 pounds (weight per 500 sheets—24" x 36"), an opacity of 82.8% as measured on the Bausch and Lomb opacimeter and a blue brightness of 71.0% as measured on the Higgins brightness tester. Sheets of paper made under identical conditions except that an equal weight of a prior art lithopone was substituted for my novel lithopone, comprising 10.24% prior art lithopone, had a basis weight of 30 pounds, an opacity of only 79.1% and a blue brightness of only 68.5%.

Example VII

A casein solution was prepared by stirring 100 grams of casein for one-half hour in 450 grams water, adding thereto 4 grams of borax and 6 grams of trisodium-phosphate dissolved in 80 grams water at 65° C. heating the resultant mixture to 65° C. with stirring on a water bath, adding 12 cubic centimeters of 27% $NH_4OH$, allowing the whole to cool with stirring, and diluting with water to a total weight of 667 grams. Paper coating compositions were prepared by stirring 25 gram portions of the hereinabove described casein solution into intimately mixed pigment water compositions consisting of 43.7 grams water and 31.25 grams of, (1) the novel lithopone product of the aforementioned Example IV and, (2) a prior art lithopone. The resultant compositions were passed through a 100 mesh screen, and essentially equal weights thereof were brushed out on a coating paper, such as that used in the manufacture of coated book paper. The coated papers were then allowed to dry. The uncoated coating paper had a blue brightness of 60.0% as measured on the Higgins brightness tester. The paper coated with 12.2 pounds per ream (500 sheets—24" x 36") of the air-dryed casein composition, comprising the novel lithopone of my invention, had a brightness of 80.7%. The paper coated with 12.3 pounds per ream of the composition comprising the prior art lithopone had a brightness of only 75.7%.

Various arrangements and selections of equipment for the operation of my novel process are possible. In the preferred arrangement, however, I add 8%, on the basis of the pigment, of a sodium silicate solution comprising 23.5% $SiO_2$ and 6.2% $Na_2O$, to a suspension of pigment in water in a mechanically agitated tank. The suspension is agitated sufficiently to insure complete dispersion of the sodium silicate and is then acidified with sulfuric acid, for example, precipitating gel-like silica on the surface of the pigment particles. The pigment thus treated is filtered, dried at about 140° C. and after dry milling to break up lumps formed on drying is ready for use.

It is to be understood that the hereinbefore described specific embodiments of my invention may be subject to variation and modification without departing from the scope of this invention. For instance, while the invention has been described with particular application to the treatment of lithopone, the treatment of other types of white pigment material is also contemplated. Accordingly, the term "white pigment," as employed herein and in the appended claims includes not only lithopone but also those white pigment materials such as titanium oxide, extended titanium oxide pigments, titanates of divalent metals, zirconium oxide, zirconium silicate, lithopone, zinc sulfide, zinc oxide, antimony oxide, white lead, and the like comprising prime white pigments such as $Sb_2O_3$, $2PbCO_3.Pb(OH)_2$, $PbSO_4$, $PbSO_4.PbO$, $TiO_2$, $CaTiO_3$, $MgTiO_3$, $ZnTiO_3$ $ZnO$, $ZnS$, $ZrO_2$, $ZrSiO_4$, and the like having a refractive index of not less than about 1.9, whose pigment properties have been developed by calcination, autoclaving, or other treatment, as by the processes of U. S. Patents 1,704,483, 1,892,693, 1,977,583, 2,006,259, 2,046,054, and the like.

It is further to be understood that in the case of such pigments as titanium oxide, lithopone and the like which are calcined during the process of manufacture of said pigments, the treating agent is added to the calcined pigment and not to the pigment before the calcination operation, i. e. it is to be understood that the pigment should not be calcined after addition of the treating agent.

It is still further to be understood that the treating agent employed may be a solution of one or any combination of water soluble silicates, such as water soluble silicates of sodium, potassium, rubidium, cesium, and the like. However, because of the superior results obtained therewith, the silicate solutions which I prefer to employ are those of the water soluble sodium silicates, preferably a sodium silicate having a $SiO_2:Na_2O$ ratio of about 3.8:1 by weight.

It is still further to be understood that a coating of the gel-like silica may be formed on the pigment material particles by any of the processes well-known in the art whereby a major part, i. e. 50% or more, of the $SiO_2$ of the added water soluble silicate is deposited on the surface of the pigment particles, more particularly by acidification of a water soluble silicate comprising pigment suspension. In most instances, I prefer to add said water soluble silicate to a pigment suspension comprising not less than about 200 grams and preferably not less than about 250 grams of pigment per liter and, thereafter, to precipitate the silica on the pigment particles by addition of a water soluble acid, such as sulfuric acid, hydrochloric acid, a phosphoric acid, and the like. However, I may practice the herein described invention by addition of the water soluble silicate solution to a previously acidified pigment suspension, although on account of the ease of manipulation and the superior results ordinarily obtained thereby, I usually prefer to add the acid after addition of the soluble silicate solution. In any case, it is essential that the pigment suspension after treatment with the water soluble silicate and acid should have a pH of less than about 7, and preferably less than about 6. After the silica has been precipitated on the pigment material particles by reaction of the water soluble silicate with the acid, to provide a pigment suspension having a pH of less than about 7, and preferably less than about 6, I have found it desirable to adjust the pH of said pigment suspension to more than about 6, and preferably more than about 7, prior to the dewatering of said suspension, as by the addition of an alkaline reacting material such as barium hydroxide, sodium carbonate, and the like.

It is still further to be understood that the amount of treating agent required by a given pigment material can best be learned by experimental trial and the amount will vary with the treating agent, the type and previous history of the pigment material, the concentration of the pigment slurry, and the properties desired in the finished pigment. With the agents which I have found most satisfactory, viz., sodium silicates, appreciable effects are obtained by addition of the silicate in an amount corresponding to as little as about 0.7%, and in an amount equivalent to as high as about 35%, calculated as $SiO_2$ and based upon the weight of pigment in the slurry. For optimum effects, however, I prefer to add the silicate in amounts equivalent to from about 1.5% to about 8% $SiO_2$. Percentages of water-soluble silicates higher than about 35%, calculated as $SiO_2$, result in decreased surface hiding power.

It is still further to be understood that the optimum amount of gel-like structure silica precipitated on the surface of the pigment material particles can best be learned by experimental trial and the amount will vary with the precipitating conditions, the type and previous history of the pigment material, and the properties desired in the finished pigment. Appreciable effects are obtained when the white pigment is coated with gel-like silica in an amount corresponding to as little as about 0.35% and as high as about 35%, calculated as $SiO_2$ and based on the weight of the pigment before treatment. Optimum results are obtained, however, when the novel high surface hiding power pigment of this invention comprises between about 0.75% and about 20%, and preferably between about 1.5% and about 8%, calculated as $SiO_2$ and based on the weight of the pigment before treatment, of a gel-like structure of uncalcined silica precipitated on the white pigment particles.

It is still further to be understood that drying of the white pigment coated with gel-like silica is an essential step in my novel process. It is essential that the pigment should not be calcined after being coated with the gel-like silica. I have found it desirable to dry the pigment at a temperature not in excess of about 300° C. and preferably not in excess of about 200° C. Temperatures of less than about 100° C. should be avoided unless the pigment is dried at subatmospheric pressures.

The herein described process imparts to pigment materials a new property which I call surface hiding power. The treating agent forms an amorphous gel surrounding the pigment particles. Upon drying, this leaves a system of pigment particle aggregates stabilized by a skeleton structure of the gel. Thus the treated pigment is more porous and bulky than the untreated pigment. As a consequence of my novel treatment there are imparted to pigment materials not only the property of surface hiding power but also the properties of hitherto unrealized high oil absorption, high dry bulking value, high flat hiding power, and high opacifying and brightening power in paper and in coating compositions of casein, starch and the like applied to the surface of paper. For example, lithopone treated by my novel process with sodium silicate in an amount between about 1.5% and about 8% of $SiO_2$, on the basis of the pigment, had its flat hiding power increased between about 20% and about 65%, its dry bulking value increased between about 15% and about 63%, its oil absorption increased between about 45% and about 140%, its opacifying and brightening power in paper increased about 30%, and its brightening power in casein paper coatings increased between about 25% and about 60%.

Minor increases in surface hiding power are of little industrial importance. Therefore, the pigments produced according to my novel process, as compared with prior art pigments, have an increase of at least about 25% and preferably at least about 40% in oil absorption, and an increase of at least about 10% and preferably at least about 15% in flat hiding power and bulking value. Further, the opacifying and brightening power of coatings of casein, starch, and the like, when applied to paper, is increased at least about 10% and preferably at least about 15%.

It is to be understood that the increase in flat hiding power mentioned hereinabove, refers to the percentage increase in flat hiding power of a treated pigment as compared to the same pigment before treatment by my novel process. This is determined according to the hereinbefore described pigment flat hiding power test in a flat paint composition compising 25.8% pigment by volume, 25.92% 50 gal. limed rosin varnish, 4.18% acid refined linseed oil of acid number 5, and 44.1% petroleum spirits.

My process possesses advantages not previously combined in a single process. Furthermore, the products of my process possess advantages not previously combined in a pigment material. The high surface hiding pigment resulting from the operation of my process, when used in flat paint formulations imparts heretofore unrealized high hiding to the dry paint film. Such paint formulations are prepared at essentially the same cost and are far superior to flat paints hitherto manufactured. Furthermore, the novel pigment products of my invention, when employed as paper fillers or in compositions of starch, casein, glue and the like, applied to the surface of paper, produce papers which are definitely superior in opacity and brightness as compared to those pigmented in an analogous manner with corresponding prior art pigments.

As many apparently widely different embodiments of this invention may be made without departing from the spirit and scope thereof, it is to be understood that I do not limit myself to the specific embodiment except as defined in the appended claims.

Having described the present invention the following is claimed as new and useful.

1. A process for producing a pigment of improved surface hiding power which comprises mixing a water soluble silicate with an aqueous suspension of a white pigment, precipitating silica as a gel-like coating on said pigment by acidifying the suspension, dewatering the pigment suspension and drying the pigment without calcination.

2. A process for producing a pigment of improved surface hiding power which comprises mixing with an aqueous suspension of a white pigment a water soluble silicate and a water soluble acid thereby precipitating at least 50% of the silica as a gel-like coating on said pigment, dewatering the pigment suspension and drying the pigment without calcination.

3. A process for producing a pigment of improved surface hiding power which comprises mixing a water soluble silicate with an aqueous suspension of a white pigment, acidifying the slurry thereby precipitating at least 50% of the silica as a gel-like coating on said pigment, and thereafter dewatering the pigment slurry and drying the pigment without calcination.

4. A process for producing a pigment of improved surface hiding power which comprises mixing with an aqueous suspension of a white pigment between about 0.7% and about 35%, calculated as $SiO_2$ and based on the weight of the pigment before treatment, of a water soluble silicate, acidifying the slurry, dewatering said slurry and drying the pigment at a temperature not in excess of about 300° C.

5. A process for producing a pigment of improved surface hiding power which comprises mixing with an aqueous suspension of a white pigment between about 1.5% and about 8%, calculated as $SiO_2$ and based on the weight of the pigment before treatment, of a water soluble silicate, acidifying the slurry by the addition of sulfuric acid, and subsequently dewatering the slurry and drying the pigment at a temperature not in excess of about 200° C.

6. A process for producing a pigment of improved surface hiding power which comprises mixing sodium silicate with an aqueous suspension of a white pigment, acidifying the slurry thereby precipitating silica as a gel-like coating on said pigment, and thereafter dewatering the slurry and drying the pigment without calcination.

7. A process for producing a pigment of improved surface hiding power which comprises mixing with an aqueous suspension of a white pigment between about 0.7% and about 35%, calculated as $SiO_2$ and based on the weight of the pigment before treatment, of sodium silicate, acidifying the slurry, dewatering said slurry and drying the pigment at a temperature not in excess of about 300° C.

8. A process for producing a pigment of improved surface hiding power which comprises mixing with an aqueous suspension of a white pigment between about 1.5% and about 8%, calculated as $SiO_2$ and based on the weight of the pigment before treatment, of sodium silicate, acidifying the slurry by the addition of sulfuric acid, and subsequently dewatering the slurry and drying the pigment at a temperature not in excess of about 200° C.

9. A pigment of improved surface hiding power which comprises a white pigment coated with a minor amount of uncalcined gel-like silica.

10. A pigment of improved surface hiding power which comprises a white pigment coated with uncalcined gel-like silica in an amount in the range of from about 0.35% to about 35%, calculated as $SiO_2$ and based on the weight of the pigment before treatment.

11. A pigment of improved surface hiding power which comprises a white pigment and between about 1.5% and about 8%, calculated as $SiO_2$ and based on the weight of the pigment before treatment, of a gel-like structure of uncalcined silica precipitated on the white pigment particles.

12. An improved white pigment comprising a white pigment coated with a minor amount of uncalcined gel-like silica, said improved pigment having at least about 10% higher flat hiding power than a comparable untreated pigment.

13. An improved white pigment whose particles are coated with between about 0.35% and about 35%, calculated as $SiO_2$, of uncalcined gel-like silica, said white pigment having at least about 10% greater flat hiding power than a similarly prepared pigment not coated with said gel-like silica.

14. A process for producing a pigment of improved surface hiding power which comprises mixing an aqueous suspension comprising a water soluble silicate, a white pigment, and an acidic reagent, thereby precipitating silica as a gel-like coating on said pigment, dewatering the pigment suspension and drying the pigment without calcination.

15. A process for producing a pigment of improved surface hiding power which comprises mixing an aqueous suspension comprising a water soluble silicate, lithophone, and an acidic reagent, thereby precipitating silica as a gel-like coating on said pigment, dewatering the pigment suspension and drying the pigment without calcination.

16. A process for producing a pigment of improved surface hiding power which comprises mixing an aqueous suspension comprising a water soluble silicate, zinc sulfide, and an acidic reagent, thereby precipitating silica as a gel-like coating on said pigment, dewatering the pigment suspension and drying the pigment without calcination.

17. A process for producing a pigment of improved surface hiding power which comprises mixing with an aqueous suspension of a white pigment between about 1.5% and about 8%, calculated as $SiO_2$ and based on the weight of the pigment before treatment, of a water soluble silicate, acidifying the slurry by the addition of sulfuric acid, and subsequently dewatering the slurry and drying the pigment at a temperature between about 110° C. and about 175° C.

18. A process for producing a pigment of improved surface hiding power which comprises mixing with an aqueous suspension of a white pigment between about 1.5% and about 8%, calculated as $SiO_2$ and based on the weight of the pigment before treatment, of sodium silicate, said sodium silicate having an $SiO_2:Na_2O$ ratio of about 3.8:1 by weight, acidifying the slurry by the addition of sulfuric acid, and subsequently dewatering the slurry and drying the pigment at a temperature between about 110° C. and 175° C.

19. A process for producing a pigment of improved surface hiding power which comprises mixing with an aqueous suspension of lithopone between about 0.7% and about 35%, calculated as $SiO_2$ and based on the weight of the pigment before treatment, of a water soluble silicate, acidifying the slurry, dewatering said slurry and drying the pigment at a temperature not in excess of about 300° C.

20. A process for producing a pigment of improved surface hiding power which comprises mixing with an aqueous suspension of zinc sulfide between about 0.7% and about 35%, calculated as $SiO_2$ and based on the weight of the pigment before treatment, of a water soluble silicate, acidifying the slurry, dewatering said slurry and drying the pigment at a temperature not in excess of about 300° C.

21. An improved white pigment whose particles are coated with between about 1.5% and about 8%, calculated as $SiO_2$, of uncalcined gel-like silica, said white pigment having at least about 10% greater flat hiding power than a similarly prepared pigment not coated with said gel-like silica.

22. A pigment of improved surface hiding power which comprises lithopone coated with uncalcined gel-like silica in an amount in the range of from about 0.35% to about 35%, calculated as $SiO_2$ and based on the weight of the pigment before treatment.

23. A pigment of improved surface hiding power which comprises zinc sulfide coated with uncalcined gel-like silica in an amount in the range of from about 0.35% to about 35%, calculated as $SiO_2$ and based on the weight of the pigment before treatment.

24. A pigment of improved surface hiding power which comprises lithopone and between about 1.5% and about 8% calculated as $SiO_2$ and based on the weight of the pigment before treatment, of a gel-like structure of uncalcined silica precipitated on the lithopone particles.

25. A pigment of improved surface hiding power which comprises zinc sulfide and between about 1.5% and about 8% calculated as $SiO_2$ and based on the weight of the pigment before treatment, of a gel-like structure of uncalcined silica precipitated on the zinc sulfide particles.

26. A pigment of improved hiding power comprising a base pigment of lithopone, and the reaction product of an alkali metal silicate and an acid capable of precipitating the silicate in insoluble form, the amount of said reaction product being in amount sufficient to increase the hiding power of the pigment.

27. A pigment of improved hiding power comprising a base pigment containing titanium dioxide, and the reaction product of an alkali metal silicate and an acid capable of precipitating the silicate in insoluble form, the amount of said reaction product being in amount sufficient to increase the hiding power of the pigment.

28. A pigment of improved hiding power comprising a base pigment of lithopone having intimately associated therewith from about 1.5% to about 8%, calculated as $SiO_2$ and based on the weight of the pigment before treatment, of the insoluble reaction product of sodium silicate and sulfuric acid.

29. A pigment of improved hiding power comprising a base pigment containing titanium dioxide having intimately associated therewith from about 1.5% to about 8%, calculated as $SiO_2$ and based on the weight of the pigment before treatment, of the insoluble reaction product of sodium silicate and sulfuric acid.

MARION L. HANAHAN.